United States Patent
Hansen

(10) Patent No.: US 6,179,142 B1
(45) Date of Patent: Jan. 30, 2001

(54) WIRE-FRAME BOTTLE AND METHOD OF MANUFACTURING SAME

(75) Inventor: Jeffrey E. Hansen, Acworth, GA (US)

(73) Assignee: The Coca-Cola Company, Atlanta, GA (US)

(*) Notice: Under 35 U.S.C. 154(b), the term of this patent shall be extended for 0 days.

(21) Appl. No.: 09/058,845

(22) Filed: Apr. 13, 1998

(51) Int. Cl.[7] .............................. B65D 1/02; B65D 1/48; B65D 23/00
(52) U.S. Cl. .................... 215/382; 215/395; 215/900; 220/743
(58) Field of Search .................. 215/382–395, 215/900, 121; 220/743

(56) References Cited

U.S. PATENT DOCUMENTS

| | | | |
|---|---|---|---|
| 916,250 | * | 3/1909 | Arbogast ........................ 215/382 X |
| 1,438,272 | * | 12/1922 | Snyder et al. .................. 215/395 X |
| 1,459,192 | * | 6/1923 | Bell ................................ 220/743 X |
| 1,629,871 | * | 5/1927 | Hornaday ....................... 215/395 X |
| 2,630,154 | * | 3/1953 | Sallac ............................. 215/900 X |
| 2,715,980 | | 8/1955 | Frick . |
| 2,732,977 | | 1/1956 | Charpiat . |
| 3,040,933 | | 6/1962 | Everett . |
| 3,118,572 | | 1/1964 | Harding . |
| 3,161,327 | | 12/1964 | Kraus . |
| 3,178,062 | | 4/1965 | Welty et al. . |
| 3,239,102 | | 3/1966 | Heydon et al. . |
| 3,409,714 | | 11/1968 | Strugar, Jr. . |
| 3,484,011 | | 12/1969 | Greenhalgh et al. . |
| 3,592,360 | | 7/1971 | Aleck . |
| 3,727,783 | | 4/1973 | Carmichael . |
| 3,876,119 | | 4/1975 | Lamkin . |
| 3,940,001 | | 2/1976 | Haefner et al. . |
| 4,008,830 | | 2/1977 | Meshberg . |
| 4,008,831 | | 2/1977 | Vidilles . |
| 4,170,622 | * | 10/1979 | Uhlig ............................ 215/382 X |
| 4,286,636 | | 9/1981 | Credle . |
| 4,456,134 | * | 6/1984 | Cooper .......................... 215/382 X |
| 4,463,875 | | 8/1984 | Tepic . |

(List continued on next page.)

FOREIGN PATENT DOCUMENTS

| | | |
|---|---|---|
| 570451 | 9/1961 | (BE) . |
| 3618634A1 | 12/1987 | (DE) . |
| 0182094B1 | 8/1990 | (EP) . |
| 1032825 | 6/1966 | (GB) . |
| 1171612 | 11/1969 | (GB) . |

OTHER PUBLICATIONS

"Whatever Happened to Versaform's Plastic/Paper Marriage?", *Brand Packaging Highlights*, Spring 1997, p. 7.

*Primary Examiner*—Sue A. Weaver
(74) *Attorney, Agent, or Firm*—Finnegan, Henderson, Farabow, Garrett & Dunner, L.L.P.

(57) ABSTRACT

A wire-frame or supporting framework for a bottle has an interior portion of high barrier, thin, non-toxic plastic, for example, blow-molded polyethylene naphalate, and an outer portion of rigid or semi-rigid plastic cage-like structure, for example, injection molded polyethylene terephthalate. A method of manufacturing the aforesaid bottle includes the steps of forming the outer supporting wire-frame structure, inserting a preform therein and blow-molding the preform within the supporting wire-frame structure to form the bottle of defined size and shape.

19 Claims, 3 Drawing Sheets

U.S. PATENT DOCUMENTS

| | | |
|---|---|---|
| 4,482,588 | 11/1984 | Fagerburg et al. . |
| 4,484,697 | 11/1984 | Fry, Jr. . |
| 4,501,781 | 2/1985 | Kushida et al. . |
| 4,550,043 | 10/1985 | Beck . |
| 4,609,516 | 9/1986 | Krishnakumar et al. . |
| 4,646,925 | 3/1987 | Nohara . |
| 4,696,840 | 9/1987 | McCullough et al. . |
| 4,723,688 | 2/1988 | Munoz . |
| 4,881,666 | 11/1989 | Tullman et al. . |
| 4,890,757 * | 1/1990 | Robbins, III ................ 215/382 X |
| 4,892,230 | 1/1990 | Lynn, Jr. . |
| 4,921,135 | 5/1990 | Plest . |
| 4,925,055 * | 5/1990 | Robbins, III et al. .......... 215/900 X |
| 4,966,543 | 10/1990 | Krishnakumar et al. . |
| 4,979,628 * | 12/1990 | Robbins, III ................ 215/395 |
| 4,979,631 | 12/1990 | Krishnaukumar et al. . |
| 4,980,100 | 12/1990 | Krishnakumar et al. . |
| 4,997,692 * | 3/1991 | Yoshono ................ 215/382 X |
| 5,037,002 | 8/1991 | Tschanen . |
| 5,226,551 * | 7/1993 | Robbins, III ................ 215/395 X |
| 5,242,085 | 9/1993 | Richter et al. . |
| 5,242,086 | 9/1993 | Richter et al. . |
| 5,344,045 | 9/1994 | Richter et al. . |
| 5,381,927 | 1/1995 | Richter et al. . |
| 5,383,576 | 1/1995 | Richter et al. . |
| 5,385,269 | 1/1995 | Richter et al. . |
| 5,433,347 | 7/1995 | Richter et al. . |
| 5,740,934 * | 4/1998 | Brady ................ 215/382 X |

* cited by examiner

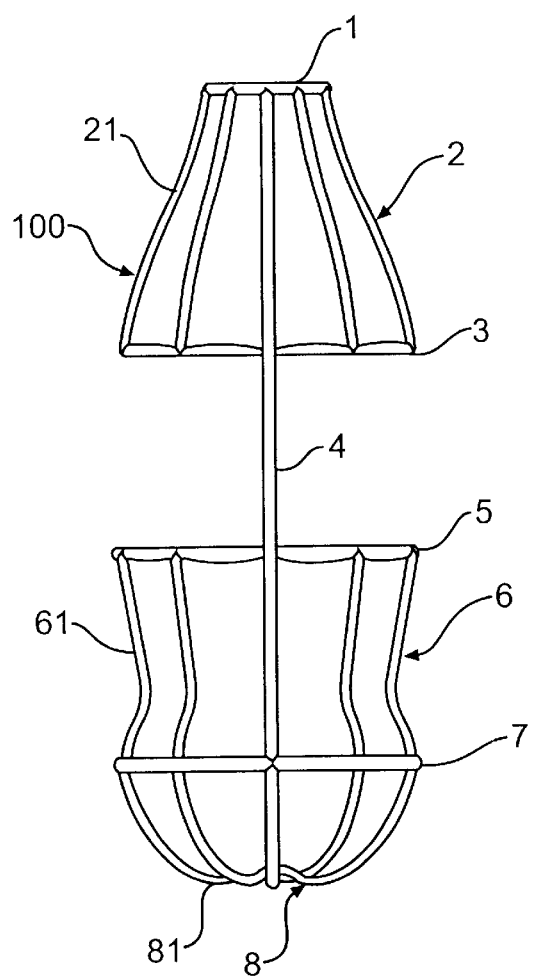
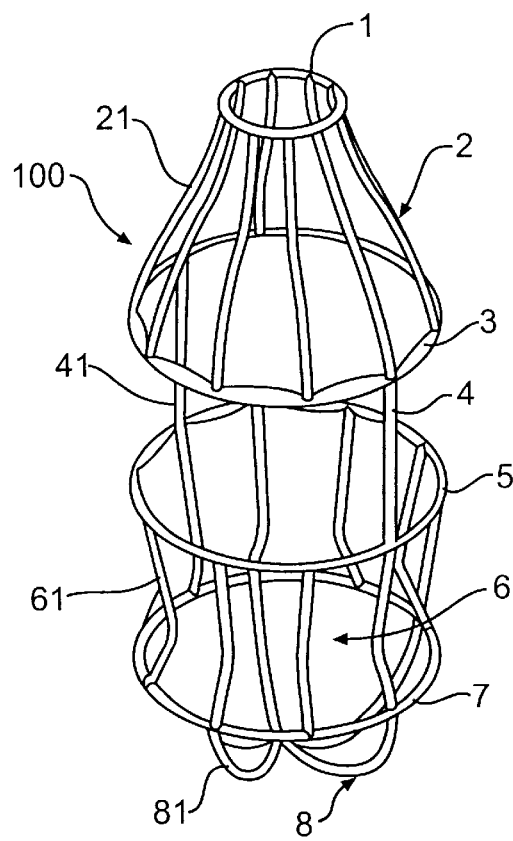
FIG. 1
FIG. 2

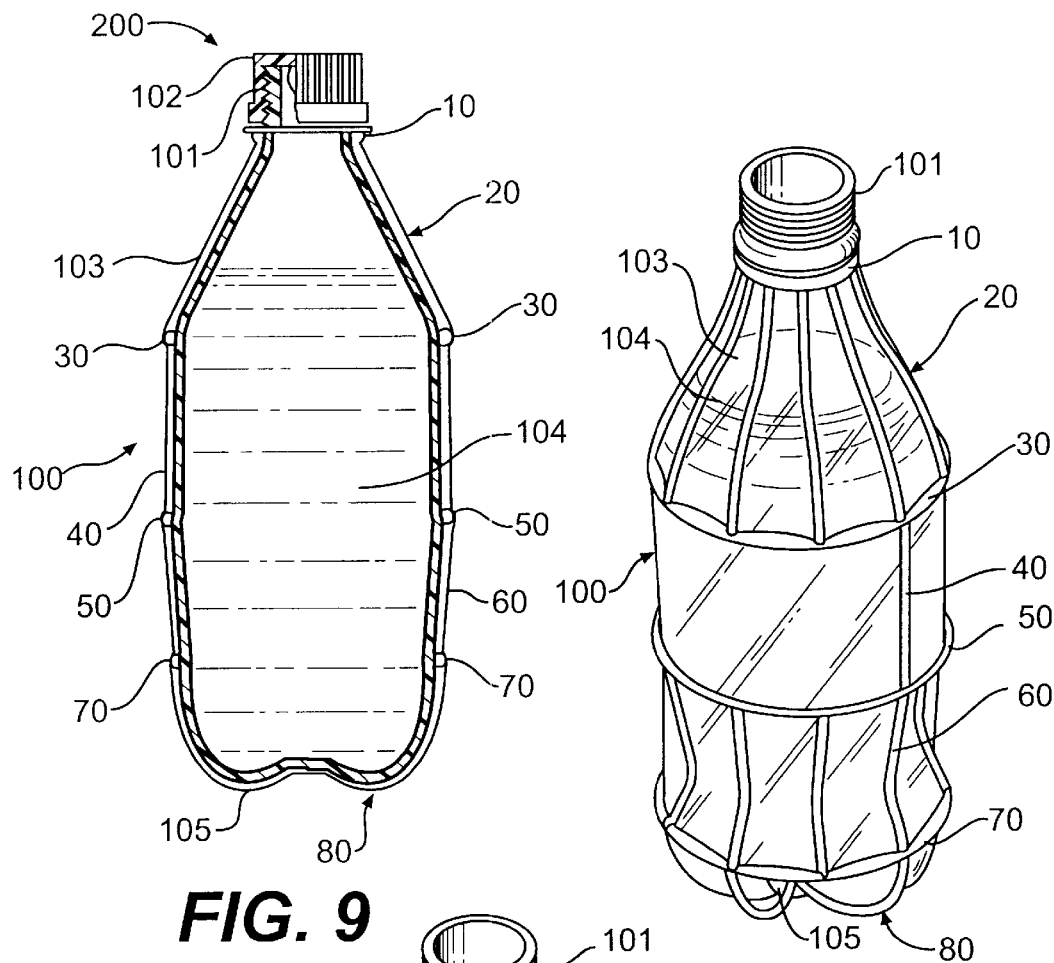
FIG. 9
FIG. 10
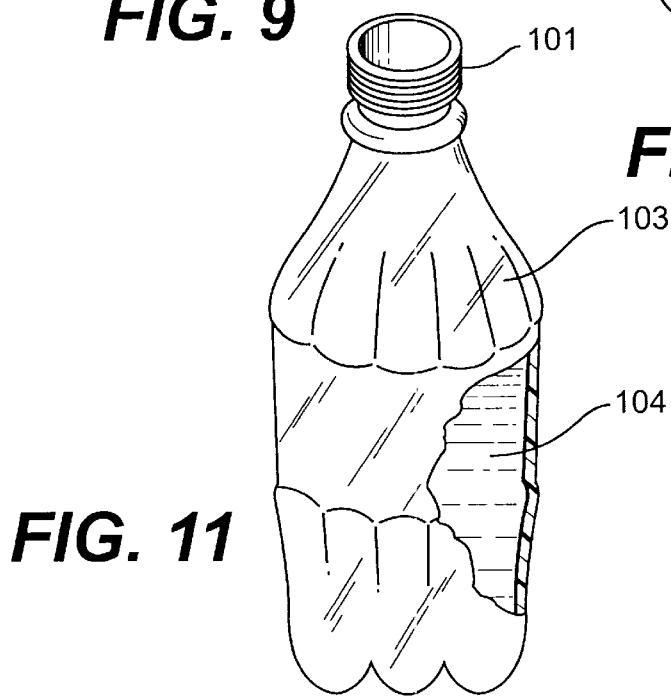
FIG. 11

WIRE-FRAME BOTTLE AND METHOD OF MANUFACTURING SAME

BACKGROUND OF THE INVENTION

1. Field of the Invention

This invention relates to a "wire-frame" contour bottle in which the interior portion comprises a thin high barrier collapsible plastic material and the exterior portion comprises a cage-like structure or wire frame structure which supports the interior collapsible plastic container which may be under stress from gaseous contents of the bottle under pressure when closed. The invention also relates to new and useful improvements in the process of manufacturing a contour bottle suitable for containing liquids such as carbonated beverages under pressure with carbon dioxide gas dissolved therein. It should be noted that the term "wire-frame" structure is not necessarily used to denote a pliable metallic strand but is used to indicate something which resembles a wire, as in slenderness or stiffness. As will be explained below, various materials can be used to make the wire-frame structure of the present invention, but these materials do not necessarily have to be metal.

2. Description of the Background Art

The concept of an outer rigid or semi-rigid supporting portion and an inner flexible, high barrier portion of a composite container is known in the art of container manufacture. For example, U.S. Pat. No. 4,696,840 discloses an improved bag-in-box (BIB) composite container wherein an inner bag is blow-molded inside the container's outer box. The inner layer is made from a preform of polyethylene terephthalate (PET), for example.

More recently, liquid containers having a rigid outer supporting portion and an inner collapsible portion with specific objects and improvements are described in U.S. Pat. Nos. 5,344,045 and 5,385,269.

Conventional containers of outer rigid supporting structure with inner flexible collapsible material are well known and old in the art, for example, U.S. Pat. No. 4,286,636.

SUMMARY OF THE INVENTION

Although the art has known of two part bottles having a rigid supporting portion and an inner collapsible portion, the concept of an outer "wire-frame" supporting portion has not been known up to now.

The contour bottle of the invention can comprise an outer supporting framework in the shape of the familiar Coca-Cola Contour Bottle design, a registered trademark of The Coca-Cola Company, Atlanta, Ga., U.S.A. Of course, any suitably shaped framework can be used. The inner high barrier portion of the contour bottle is within, and supported by, the outer supporting framework and conforms to the shape of the exterior supporting framework when filled with contents comprising fluid, for example, liquid or gas.

Generally, the high barrier material is made of a non-toxic, plastic material such as a polyester for example, polyethylene (PEN). The exterior framework or supporting "wire-frame" is made from any suitable materials with the needed rigidity and strength characteristics to support the inner material so as to maintain the shape of the bottle.

OBJECTS OF THE INVENTION

It is an object of the invention to provide a bottle comprising a thin high barrier collapsible plastic material bottle supported by a plastic wire-frame structure to give shape and structural support to the bottle.

Yet another object of the present invention is to provide a bottle which is inexpensive to manufacture and which reduces an amount of material required to make the bottle while producing a bottle which maintains its structural integrity.

A further object of the invention is the provision of a method of using a plastic wire-frame structure in making a bottle of predetermined shape and contour.

Still another object of the invention is the provision of a wire-frame plastic structure whose contours are shaped to support an inner plastic bottle in the form of the familiar Coca-Cola Contour Bottle design.

These and other objects of the present invention are fulfilled by a bottle which comprises an outer wire-frame cage structure and an inner structure comprising a thin high barrier non-toxic plastic container for holding fluid contents therein.

In addition, these and other objects of the present invention are fulfilled by method of manufacturing a bottle which comprises an outer wire-frame cage structure and an inner structure comprising a thin high barrier non-toxic plastic container for holding fluid contents therein, and wherein the method comprises the steps of (a) forming an outer wire-frame supporting structure of defined shape; (b) inserting a preform of thin, high barrier non-toxic material inside said wire-frame; and (c) blow-molding said preform within the wire-frame and forming a container of defined size and shape supported by the wire-frame when the inner plastic container contains fluid contents.

These and other objects are also fulfilled by a wire-frame cage for a contour bottle which comprises: (a) an upper portion comprising a plurality of struts for supporting and shaping the upper portion of an inner collapsible container; (b) a lower portion comprising a plurality of struts for supporting and shaping the lower portion of said inner collapsible container; and (c) a middle portion comprising at least two supporting struts joining the upper portion of the wire-frame with the lower portion of the wire-frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention is more fully understood from the detailed description which follows when read in conjunction with the accompanying drawings which are given by way of illustration only, and thus are not limitative of the present invention, and in which like reference numerals refer to like elements and wherein:

FIG. 1 is a side, plan view of the wire-frame structure according to the present invention;

FIG. 2 is a perspective view of the wire-frame structure according to the present invention;

FIG. 9 is a cross-sectional view of the contour bottle according to the present invention in which the wire-frame structure is shown supporting and shaping a high barrier material inside the wire-frame;

FIG. 10 is a perspective view of the contour bottle according to the present invention in which the wire-frame structure is shown supporting and shaping the high barrier material inside the wire-frame; and FIG. 11 is a perspective view of the inner container of the present invention partially cut away to show the fluid contents therein.

DETAILED DESCRIPTION OF THE PREFERRED EMBODIMENTS

Figure 3:
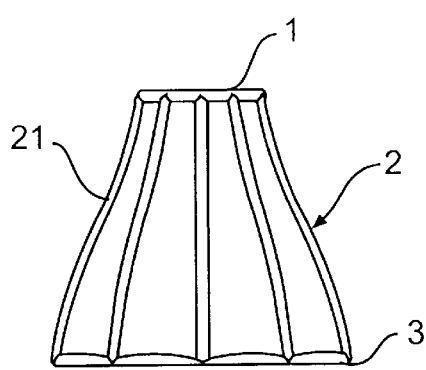
FIG. 3 is a side, plan view of the upper portion of the wire-frame structure according to the present invention.
Figure 4:
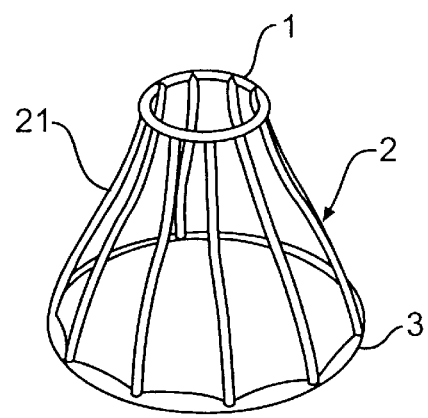
FIG. 4 is a perspective view of the upper portion of the wire-frame structure according to the present invention.
Figure 5:
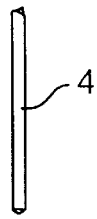
FIG. 5 is a side, plan view of a connecting member or strut of the wire-frame structure for securing the upper portion of the wire frame to the lower portion according to the present invention.
Figure 6:
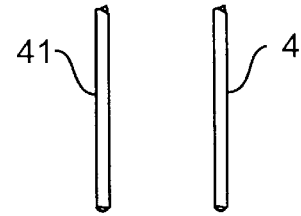
FIG. 6 shows a front view of the connecting members or struts of the present invention.
Figure 7:
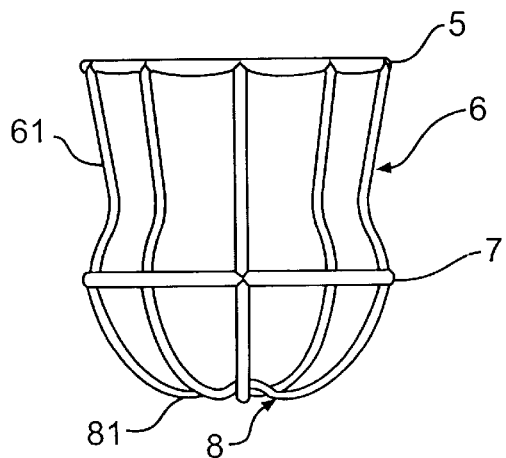
FIG. 7 is a cross-sectional side view of the lower portion of the wire-frame structure according to the present invention.
Figure 8:
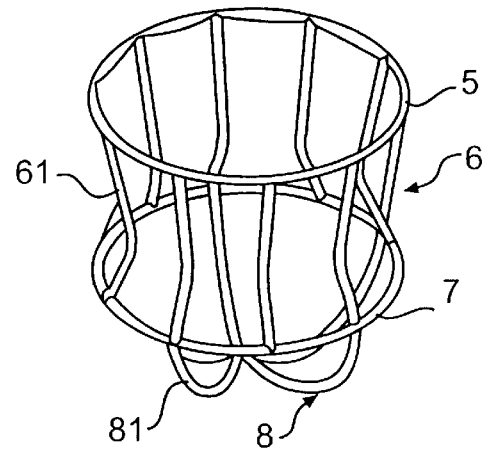
FIG. 8 is a perspective view of the lower portion of the wire-frame structure according to the present invention.

Referring in detail to the drawings and with particular reference to FIGS. 1–8, the cage or wire-frame structure of the present invention is shown, while in FIGS. 9–11, the Coca-Cola Contour Bottle design of the invention is shown. As noted above, while a Coca-Cola Contour Bottle design is shown and described, it should be appreciated that the present invention can be used to form many different shaped bottles. Moreover, while the present invention is discussed as being used to make a bottle, the principles of this invention are suitable to make many different types of containers.

The method of manufacturing the outer cage or wire-frame structure 100 involves separately forming the upper portion 2 and lower portion 6 of the wire-frame structure and then joining them together with connecting members or struts 4, 41. Numerals 4 and 41 have been used to designate a right and left strut, respectively as shown, for example, in FIG. 6.

The upper portion 2 of the wire-frame structure 100 is injection molded with a circular member 1 to which a plurality of concave arcuate strut members 21 are joined and connected to a circular member 3 whose diameter is larger than that of circular member 1. A plurality of concave struts 21 are used, preferably eight struts spaced evenly or symmetrically around the circular members 1 and 3. Of course, any number or positioning of struts 21 could be used. These struts 21 could, for example, be non-uniformly spaced around the circumference of the upper portion 2 of the wire-frame structure 100. For example, if a box instead of a bottle shape were being made, then differently sized and spaced struts 21 could be used.

The lower portion 6 of the wire-frame structure 100 is also injection molded with two circular members 5 and 7 of approximately the same diameter as the larger circular member 3 in the upper portion of the wire-frame. As should be evident, any suitable size of circular members 1, 3, 5 and/or 7 could be used. In fact, square, rectangular, oval, star-shaped, polygonal or any suitably shaped, sized or number of members could be used in place of the circular members 1, 3, 5 and/or 7. It is merely contemplated that suitable members will be provided to give some support to the struts 21, 61 and 81 to be described below.

In particular, the circular members 5 and 7 are joined by connecting members or struts 61 whose shapes are arcuate convex whereas the shapes of the arcuate strut members 21 of the upper portion 2 are concave. The connecting members or convex arcuate struts 61 connecting circular members 5 and 7 generally approximate the same number as those of the upper portion concave strut members 21. Of course, fewer or more strut members 21 could be used as compared to the strut members 61.

The upper and lower portions 2, 6 of the wire-frame structure 100 are preferably joined by a minimum of two struts 4, 41 although more than two struts may be used. It is generally more convenient to use the minimum number of struts so that the middle portion of the inner container is clearly visible and unobstructed for placement of labels and the like.

The bottom 8 of the lower portion 6 seen in FIGS. 1 and 2 is formed from concave arcuate struts 81 and there are as many concave struts 81 at the bottom as are joining circular members 5 and 7, namely convex arcuate struts 61. Again, any suitable number of struts 81 can be used. Moreover, the struts 21, 4, 41, 61 and 81 can have any desired cross-sectional shape, such as circular, oval, square, etc. Moreover, the struts can all generally have a same diameter as shown or can have different diameters if so desired. For example, the struts 61, 81 can be larger than the struts 21, 4 and 41 if so desired.

The struts make up the wire-frame structure 100. The designation of this structure 100 as "wire-frame" is not necessarily to imply that a pliable metallic strand is used but is merely to indicate that the struts which make up this structure resemble a wire, as in slenderness or stiffness. As will be explained below, various materials can be used to make the struts of the wire-frame structure 100, but these materials do not necessarily have to be metal. While the drawings show relatively slender struts 21, 4, 41, 61 and 81, much fatter struts or flat planks could be used for these members as noted above.

The contour bottle 200 of the present invention is shown in FIGS. 9 and 10. This bottle 200 is manufactured using the wire-frame structure 100 as an outer structure to support and shape an inner plastic bottle 103 as shown in FIG. 11. This inner bottle 103 is made from a preform which is blow-molded to conform to the shape of the cage or wire-frame structure 100. The shape of the inner bottle 103 would therefore be dependent on the shape of the wire-frame structure 100. When inserted into the wire-frame structure 100, the neck of the inner bottle 103 extends above the circular member 1, 10. Of course, the height of the inner bottle 103 could be less than the height of the wire-frame structure 100, if so desired.

The inner bottle 103 can be freely rotatable relative to the wire-frame structure 100 after the step of blow-molding. Of course, if sufficient internal pressure is applied during this blow-molding step, the inner bottle preform can be made to bulge outwardly beyond the struts of the wire-frame structure 100. If the inner bottle 103 is sufficiently rigid, then it would be fixed in place relative to the wire-frame structure. However, because a relatively thin, pliable material is contemplated as being used for the preform, it is possible that even if such blowing force is used to expand the preform slightly beyond the struts, that the preform could collapse and again be rotatable relative to the struts until some fluid fills the inner bottle again expanding the inner bottle 103 against the struts to thereby hold it in position.

Of course the materials of the inner bottle preform and the struts could be selected such that they would naturally adhere to one another. Alternatively, some adhesive could be used to bond the inner bottle 103 to at least a portion of the wire-frame structure 100. Otherwise, a welding step or other adhering step could be used to fix the inner bottle 103 relative to the wire-frame structure 100.

Fluid 104 can be introduced into the inner bottle 103 after the bottle 200 is formed as noted above. This fluid 104 can be a liquid, gas or flowable solid such as sand, for example. One fluid which is contemplated as being packaged within the bottle 200 is a beverage, such as a carbonated beverage.

In FIGS. 9 and 10, the reference numerals 10, 20, 30 . . . 80 correspond respectively to reference numerals 1, 2, 3 . . . 8 in FIGS. 1–8. The preferred composition of the inner plastic bottle 103 is polyethylene (PEN), but, in fact, any high barrier material made of a non-toxic, plastic material such as a polyacrylonitrile, PVC, and multi-layer structures using barrier layers from the nylon family, thermoplastic epoxies, and PVDC families could be used, for example. The preferred composition of the outer cage or wire-frame 100 is polyethylene terephthalate (PET), for example. While plastics are generally discussed for this wire frame structure 100, it is possible to use a metallic or composite structure, if so desired. Of course, any suitable material could be used for the inner bottle 103 and for the wire-frame structure 100.

The shell structure of the wire-frame structure 100 supports the internal stress generated by a carbonated soft-drink when the inner plastic bottle 103 of FIG. 11 contains a carbonated soft-drink as the fluid 104. The inner bottle 103 is collapsible and is fitted with means for closing the top of the bottle comprising a cap 102 having screw means within and mating with screw or thread means 101 at the outer neck or top of the inner bottle 103. These thread means 101 could instead be on the circular member 1, 10. In such a situation, the height of the member 1, 10 could be increased to accommodate the thread means 101 and the inner bottle 103 may or may not extend above the member 1, 10.

Although the inner plastic bottle 103 is contemplated as being thin to provide a material savings over existing bottles, it can still be made from a high barrier material, such as PEN, which will provide good resistance to carbon dioxide permeation and the base wire-frame design of the PET shell structure (FIGS. 1 and 2) can help prevent stress crack on the thin inner plastic bottle 103.

The method of manufacturing the Coca-Cola Contour Bottle according to the present invention includes manufacture of the injection molded shell or cage wire-frame structure 100 by injection molding PET or similar plastic. This wire-frame structure 100 can be molded as a one-piece, single, unitary structure or can be molded from several pieces which are fixed together. For example, the upper portion 2, each strut 4, 41 and both the lower portion 6 and bottom 8 can each be molded as a one-piece, single, unitary structure thereby yielding four parts which are then affixed together.

Before the different components of the wire-frame structure 100 are fixed together, the preform of the inner bottle 103 can be inserted therein. It is contemplated, however, that the wire-frame structure 100 will be completed and then this preform will be inserted through the open end at the circular member 1, 10. A high barrier plastic material with good resistance to $CO_2$ permeation such as PEN is used as the preform. In the present method of manufacture, the preform can be preheated and thereafter inserted into the wire-frame shell structure 100, after which the preform is blow-molded into the PET shell forming the inner bottle 103 to thereby form the bottle 200 of FIG. 9.

While the preferred embodiments of the invention have been described in detail, it is to be understood that variations and modifications can be made therein without departing from the spirit and scope of the present invention. For example, depending on the use of the plastic bottle, other plastic materials besides PET for the outer cage or wire-frame may be used, such as blends of polypropylene-polyethylene terephthalate or similar materials. Likewise, the inner plastic bottle may be composed of other materials than PEN, such as copolymers of ethylene and other monomers or blends of PEN with other olefinic polymers, or copolymers.

Further, it is understood that variations in the number and size of the struts in the outer wire-frame structure may be used within the spirit and scope of the present invention as noted above.

The present invention being thus described, it will be obvious that the same may be varied in many ways apart from the above-noted variations. All such variations are not to be regarded as a departure from the spirit and scope of the invention, and all such modifications as would be obvious to one skilled in the art are intended to be included within the scope of the following claims.

What is claimed is:

1. A bottle comprising:
   a cage member; and
   a thin, high-barrier, non-toxic plastic container for holding fluid contents therein, the container being movable relative to and non-removably enclosed by the cage member, wherein the container is capable of rotating relative to the cage member.

2. The bottle according to claim 1, wherein the cage member comprises a polyethylene terephthalate composition.

3. The bottle according to claim 1, wherein the container comprises a polyester plastic composition.

4. The bottle according to claim 3, wherein the polyester plastic is collapsible when fluid contents are removed.

5. The bottle according to claim 1, wherein the cage member comprises injection molded polyethylene terephthalate, and the container comprises blow-molded polyethylene napthalate.

6. The bottle according to claim 1, wherein the cage member is in the shape of a contour bottle.

7. The bottle according to claim 1, further comprising a closure means for closing the bottle, and wherein the container has inside walls and an open top, the closure means being detachably mountable on the open top of the container to thereby close the open top.

8. The bottle according to claim 7, wherein the closure means comprises a screw-on cap and the top of the container is provided with screw threads which mate with the cap.

9. The bottle according to claim 1, wherein the container is collapsible relative to the cage member.

10. The bottle according to claim 1, wherein an orientation of the container is fixable relative to the cage member.

11. A bottle comprising:
    a plastic container; and
    a cage member enclosing the container, the cage member including an upper portion and a lower portion each having at least two connecting members extending around a radial periphery of the container, the upper portion and the lower portion each having a plurality of struts connected to the two connecting members of the upper portion and the lower portion, respectively, wherein the container is movable relative to and non-removably enclosed by the cage member.

12. The bottle according to claim 11, wherein the upper portion is connected to the lower portion by at least two connecting struts such that a region is formed between the upper portion and the lower portion to allow unencumbered viewing of a central region of the container.

13. The bottle according to claim 11, wherein the upper portion encloses a neck portion of the container and the lower portion encloses a base portion of the container.

14. The bottle according to claim 11, wherein the container comprises a thin, high-barrier, non-toxic plastic container for holding fluid contents therein.

15. The bottle according to claim 11, wherein the container is shaped as a contour bottle, and the cage member conforms to the shape of the container.

16. The bottle according to claim 11, wherein the container is collapsible relative to the cage member.

17. The bottle according to claim 11, wherein the container is capable of rotating relative to the cage member and is capable of having a fixed orientation relative to the cage member.

18. A bottle which comprises an outer wire-frame cage structure and an inner structure comprising a thin, high-barrier, non-toxic plastic container for holding fluid contents therein, wherein the outer cage structure comprises injection molded polyethylene terephthalate, and the inner plastic structure comprises blow-molded polyethylene napthalate.

19. A bottle comprising:

a cage member; and a thin, high-barrier, non-toxic plastic container for holding fluid contents therein, the container being movable relative to and non-removably enclosed by the cage member, wherein the cage member comprises injection-molded polyethylene terephthalate, and the container comprises blow-molded polyethylene napthalate.

* * * * *

UNITED STATES PATENT AND TRADEMARK OFFICE
CERTIFICATE OF CORRECTION

PATENT NO. : 6,179,142 B1
DATED : January 30, 2001
INVENTOR(S) : Jeffrey E. Hansen It is certified that error appears in the above-identified patent and that said Letters Patent is hereby corrected as shown below:

Title page,
Item [75], in the Inventor, "Acworth" should read -- Marietta --.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*